United States Patent [19]

Endo et al.

[11] Patent Number: 5,106,896
[45] Date of Patent: Apr. 21, 1992

[54] SELF-LUBRICATING POLYACETAL WEAR PART

[75] Inventors: Toshihiko Endo; Osamu Kanoto; Nobujuki Matsunaga; Kiichiro Fukui; Masajuki Suzuki, all of Fuji, Japan

[73] Assignee: Polyplastics Co, Ltd., Osaka, Japan

[21] Appl. No.: 666,487

[22] Filed: Mar. 6, 1991

Related U.S. Application Data

[63] Continuation of Ser. No. 333,236, Apr. 5, 1989, abandoned.

[30] Foreign Application Priority Data

Apr. 15, 1988 [JP] Japan .................... 63-92869

[51] Int. Cl.$^5$ .............................. C08K 5/11
[52] U.S. Cl. ...................... 524/318; 524/425; 524/445; 524/451
[58] Field of Search ............... 524/311, 312, 306, 318, 524/424, 425, 445, 457

[56] References Cited

U.S. PATENT DOCUMENTS

| | | | |
|---|---|---|---|
| 3,985,661 | 10/1976 | Ikeda et al. | 252/12 |
| 4,274,986 | 6/1981 | Ikenaga et al. | 528/245.5 |
| 4,526,921 | 7/1985 | Sakurai et al. | 524/424 |
| 4,559,380 | 12/1985 | Kasuga et al. | 524/317 |
| 4,647,609 | 3/1987 | O'Brien | 524/317 |
| 4,649,179 | 3/1987 | Takagaki | 525/400 |
| 4,874,807 | 10/1989 | Endo et al. | 524/267 |
| 4,879,331 | 11/1989 | Endo et al. | 524/267 |

FOREIGN PATENT DOCUMENTS

| | | |
|---|---|---|
| 0110108 | 6/1984 | European Pat. Off. . |
| 0169721 | 1/1986 | European Pat. Off. . |
| 3404765A1 | 8/1984 | Fed. Rep. of Germany . |
| 2152590 | 4/1973 | France . |
| 1395629 | 5/1975 | United Kingdom . |

OTHER PUBLICATIONS

Katz et al.; Handbook of Fillers and Reinforcements for Plastics; Van Nostrand Reinhold Co.; 1978; pp. 85, 86, 123, 139, 143, 145, 147, 148, 166.

Patent Abstracts of Japan, vol. 9, No. 247 (C-307) (1970) Oct. 3, 1985 & JP-A-60-104152 (Mitsubishi Gas Kagaku KK) Jun. 6, 1985.

*Primary Examiner*—Paul R. Michl
*Assistant Examiner*—Edward J. Cain
*Attorney, Agent, or Firm*—Nixon & Vanderhye

[57] ABSTRACT

A self-lubricating wear part is formed of a polyacetal resin composition that includes (A) a polyacetal base resin, (B) an inorganic powder having an average particle diameter of 50 micometers or less, and a particle diameter distribution such that at least 95 percent of the particles have a diameter of 100 micrometers or less and (C) a fatty acid ester. The wear parts are particularly useful for slidable parts such as guide roller or guide pole.

2 Claims, 2 Drawing Sheets

SELF-LUBRICATING POLYACETAL WEAR PART

This is a continuation of application Ser. No. 07/333,236, filed Apr. 5, 1989, now abandoned.

FIELD OF INVENTION

The present invention relates to self-lubricating wear parts (e.g., guide rollers and guide poles for magnetic recording tapes used in video tape recorders (VTR's, 8 mm video machines and the like). More specifically, the present invention relates to wear parts fabricated from an especially formulated anti-friction polyacetal resin composition which includes an inorganic powder and a fatty acid ester.

BACKGROUND AND SUMMARY OF THE INVENTION

Polyacetal resin has been widely used in wear parts for automobiles, and electrical and electronic appliances because of its balanced mechanical properties and excellent wear and abrasion resistance, chemical resistance, heat resistance, and electrical characteristics. However, there is an ever-increasing demand to satisfy the more strict requirements for expanding end-use applications. One such requirement is to further improve the sliding characteristics of polyacetal resin (i.e., improve the anti-friction characteristics), and to maintain the same for prolonged time periods. Representative examples of wear parts that require improved sliding characteristics include guide rollers, and guide poles for use in the magnetic tape drive systems of VTR's, 8 mm videos and the like.

Polyacetal resin has been previously used as a material from which guide rollers and the like have been made. However, magnetic tape drives have more recently been designed to operate at higher tape speeds. It has therefore become increasingly more difficult for conventional polyacetal resin to satisfy various performance requirements demanded of wear parts in contact with magnetic tape running at such higher speeds. For example, wear parts in contact with higher speed magnetic tape must maintain a variety of performance characteristics over prolonged time periods, such as, sliding characteristics without an increase in the torque of the tape drive, little or no fusion of the contact surface, and/or low noise characteristics during use.

Proposals have been made to add other resins, such as fluororesins, polyolefin resins, or silicone resins so as to improve the sliding characteristics of polyacetal resins. Other proposals include incorporation of a solid lubricant, such as graphite or molybdenum disulfide, and addition of fatty acids, fatty acid esters, silicone oils, or various mineral oils into the polyacetal base resin. However, polyacetal wear parts, such a guide rollers are required to exhibit excellent dimensional accuracy in addition to adequate sliding characteristics and, if necessary, must be capable of being machined. In this respect, the incorporation of other resins, such as fluororesins or polyolefin resins, is likely to cause "burrs" and "fuzz" to be formed on the wear part's contact (sliding) surface. As a result, torque fluctuations of the tape drive and increased abrasion may occur.

The use of known oil lubricants is also not entirely satisfactory, since they tend to "bleed" onto the surface of the polyacetal resin, particularly at high temperatures. As a result, wear parts formed of an oil lubricant-containing resin usually cannot be grasped adequately by screws and/or exhibits insufficient plasticization during molding. In an extreme case, it may be impossible to mold such a resin composition. Even if the molding is successfully accomplished, the oil that "bleeds" onto the surface of the molded article renders it entirely unsuitable for use as a part in contact with magnetic tape—i.e., since the oil may contaminate the tape degrading its function.

Furthermore, although conventional techniques of improving the sliding characteristics of polyacetal resins do, in fact, initially improve the sliding characteristics of molded articles formed thereof, the initial improvements degrade over time. Thus, the use of conventional molded articles for prolonged time periods causes the sliding surface characteristics to change. As a result, increased torque in the tape drive often occurs.

As described briefly above, it is very difficult to prepare resin compositions according to known techniques to produce wear parts that can be easily fabricated and exhibit excellent short-term and long-term sliding characteristics, and excellent machinability. More particularly, what has been needed in the art is a polyacetal wear part (e.g., guide rollers or guide poles for VTR's, 8 mm video machines or the like), having balanced sliding characteristics—that is, having excellent wear and abrasion resistance with respect to metallic shafts of a high-speed tape drive—and which maintains such characteristics for prolonged periods of use. It is towards providing such a need that the present invention is directed.

According to the present invention, improved anti-frictional wear parts are provided. More specifically, wear parts according to the present invention are fabricated from a polyacetal resin composition that includes an inorganic powder having a particular particle diameter and particle diameter distribution, and a specific fatty acid ester. The polyacetal resin composition described above exhibits excellent wear part performance characteristics, particularly when the wear part is in the form of a guide roller or a guide pole (which rotates on a metallic shaft) of a magnetic tape drive for a VTR or 8 mm video machine.

The present invention more specifically relates to a wear part (e.g. tape guide rollers and/or guide poles) formed of a polyacetal resin composition which includes:

(A) a polyacetal base resin;

(B) between 1 to 20% by weight (based on the total composition weight) of an inorganic powder having an average particle diameter of 50 μm or less, and a particle diameter distribution such that at least 95% of particles have a diameter of 100 μm or less; and (C) between 0.05 to 10% by weight (based on the total composition weight) of a fatty acid ester which is the ester reaction product of a fatty acid having 5 to 32 carbon atoms with a monohydric or polyhydric alcohol having 2 to 30 carbon atoms.

Wear parts of the present invention are preferably formed of a polyacetal resin composition that includes calcium carbonate or silica as the inorganic powder component (B), and stearyl stearate, pentaerythritol monostearate, pentaerythritol tetrastearate or behenyl behanate as the fatty acid ester component (C). Stearyl stearate and pentaerythritol tetrastearate are especially preferred.

Further aspects of the present invention will become more clear after consideration is given to the following detailed description of the preferred exemplary embodiments thereof.

BRIEF DESCRIPTION OF THE ACCOMPANYING DRAWINGS

DETAILED DESCRIPTION OF THE PREFERRED EMBODIMENTS

Figure 1A:
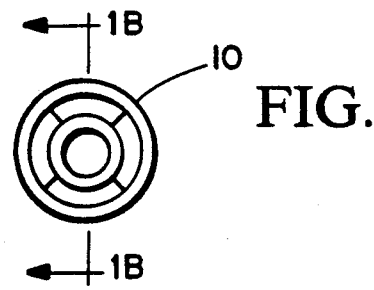
FIG. 1(A) is an end view of a guide roller used in the evaluation of a guide roller used in the evaluations to be discussed below in connection with the Examples.

The polyacetal resin used in the present invention may be any polyacetal homopolymer, or polyacetal copolymer having a main chain composed primarily of oxymethylene units. Furthermore, polyacetals modified by crosslinking or graft copolymerization according to known techniques may also be used as the base resin according to the present invention. There is no particular limitation with respect to the degree of polymerization provided that the resin can be molded.

The inorganic powder used as component (B) is required to have an average particle diameter of 50 μm or less, and a particle diameter distribution such that at least 95% of the particles have a diameter of 100 μm or less. It is preferred that the inorganic powder have an average particle diameter of 30 μm or less and that at least 90% of the particles have a diameter of 50 μm or less. It is particularly preferred that the inorganic powder have an average particle diameter of 10 μm or less.

An increase in the particle diameter of the inorganic powder causes surface irregularities on the molded article, which increases the surface roughness. As a result, large diameter powders unfavorably damage the material in sliding contact therewith, for example, a metallic shaft, producing nonuniform rotation.

In the present invention, although there is no particular limitation with respect to the kind of norganic powder that may be used, it is preferred that the inorganic powder be selected from among calcium carbonate, magnesium carbonate, talc, silica, clay, kaolin, diatomaceous earth, pearlite, and bentonite. Calcium carbonate, magnesium carbonate, talc, silica, and clay are particularly preferred.

The amount of inorganic powder to be added to the polyacetal base resin is between 1 to 20% by weight, based on the total composition weight. When insufficient amounts of inorganic powder are used little synergistic effects can be attained in combination with the fatty acid ester component (C) to be described later. In addition, it is impossible to ensure sufficient workability during extrusion, molding, machining, and the like. On the other hand, when the amount of inorganic powder exceeds the above-described range, the self-lubricity properties deteriorate thereby damaging the material in contact therewith (e.g., due to increased surface roughness of the molded article).

The fatty acid ester used as component (C) in the present invention is the ester reaction product of a fatty acid having 5 to 32 carbon atoms with a monhydric or polyhydric alcohol having 2 to 30 carbon atoms.

Examples of fatty acids include saturated fatty acids such as caproic acid, caprylic acid, undecylic acid, lauric acid, tridecylic acid, myristic acid, stearic acid, behenic acid, lignoceric acid, cerotic acid, montanic acid, and melissic acid; and unsaturated fatty acids such as oleic acid, elaidic acid, linolic acid, linolenic acid, arachidonic acid, brassidic acid, erucic acid, and ricinolic acid. Examples of alcohols for forming the ester include monohydric alcohols such a propyl, isopropyl, butyl, octyl, capryl, lauryl, myristyl, stearyl, and behenyl alcohols; and polyhydric alcohols such as ethylene glycol, propylene glycol, butanediol, and glycerin. The ester is preferably an ester of a fatty acid having 12 to 22 carbon atoms with a monohydric or polyhydric alcohol having 2 to 22 carbon atoms, and examples thereof include an ester of the following fatty acid with the following alcohol:

fatty acid: lauric acid, myristic acid, palmitic acid, stearic acid, and behenic acid; and alcohol: butyl alcohol, isopropyl alcohol, octyl alcohol, myristyl alcohol, stearyl alcohol, behenyl alcohol, ethylene glycol, propylene glycol, pentaerythritol, and glycerin.

Particularly preferable examples of the fatty acid ester include myristyl myristate pentaerythritol monostearate pentaerythritol tetrastearate, stearyl stearate and behenyl behenate.

In the present invention, the fatty acid ester is present in an amount between 0.05 to 10% by weight based on the total composition weight. When the amount of fatty acid ester is less than 0.05% by weight, little (if any) improvements in the article's sliding properties can be attained. On the other hand, when the amount of fatty acid ester is more than 10% by weight, the properties of the polyacetal base resin are deleteriously affected. It is preferred that the fatty acid ester can be incorporated into the composition in an amount between 0.1 to 5% by weight.

As described above, a principal feature of the present invention resides in the combination of a specific inorganic powder with a specific fatty acid ester in a polyacetal base resin.

In order to improve anti-frictional sliding properties particularly sliding on a high-speed tape or a metallic shaft, the addition of a fatty acid ester is more suitable than the addition of other lubricants. However, when the fatty acid ester is used alone, it is difficult to add the fatty acid ester homogeneously in amounts necessary to attaining the intended sliding properties. This brings about problems during kneading of the additive, such as so-called slip of the resin on the screw of an extruder and/or surging and venting of solid resin through vent holes. Improper and/or incomplete blending of the fatty acid ester further brings about problems during molding, such as insufficient grasp and insufficient plasticization, and problems during use, such as bleeding of large amounts of the fatty acid ester lubricant onto the surface of the molded article. As a result, it is impossible to maintain adequate sliding properties during long-term use.

By contrast, the addition of a combination of the specific inorganic powder (as described above) with a specific fatty acid ester according to the present invention provides a composition suitable for forming guide rollers and poles for magnetic tape drives, for example, eliminates the disadvantages accompanying the incorporation of the fatty acid ester lubricant alone. As a result, wear parts of such a composition exhibit improved performance characteristics generally required of sliding members necessary for use in tape drives of, e.g., VTR's and 8 mm video machines. The molded articles may also be machined into finished specified dimensions and shapes.

The addition of an inorganic rigid material is typically detrimental to sliding properties such as wear and abrasion resistance. However, a particulate material having a particle diameter specified in the present invention, particularly a fine particulate material comprising calcium carbonate, magnesium carbonate, talc, clay, or silica is surprisingly free from such a disadvantage, and its combined use and coexistence with a fatty acid ester exhibits the above-described significant synergistic effects.

Known stabilizers may be added to the compositions of the present invention for the purpose of enhancing their stability. Furthermore, known additives may be incorporated in order to improve the physical properties as dictated by intended end-use applications. Examples of such additives include lubricants, releasing agents, nucleating agents, antistatic agents, surfactants, different kinds of polymers, and organic improvers.

Furthermore, fibrous or flaky inorganic, organic, and metallic fillers and other particulate fillers may be used alone or in the form of a mixture of two or more of the same in amounts that will not affect the performance characteristics of the composition according to the present invention.

When the composition of the present invention is used as components in a magnetic tape drive system, such as a guide roller or a guide pole, electrostatic charge tends to occur and may cause problems in some cases. In this respect, it is particularly preferred to incorporate an antistatic agent into the composition.

The composition and molded article according to the present invention can be easily prepared by known methods commonly used in the art to prepare resin compositions. For example, the composition and molded article according to the present invention can be prepared by mixing individual components, integrally extruding the mixture with a single or twin screw extruder to prepare a pellet, and then molding the pellet. Optionally, a master batch of a mixture of pellets having different compositions may be subjected to molding, whereby the molded article has the intended composition after the molding operation.

A method which is preferred from the viewpoint of improving the dispersibility of the additives comprises grinding a part or the entirety of the polyacetal resin as the base material, mixing the resultant powder with other components, and then extruding the mixture.

A method which is preferred from the viewpoint of easily preparing the composition and improving the workability comprises preliminary mixing of a fatty acid ester with an inorganic powder to impregnate the powder with the fatty acid ester, kneading the impregnated powder with a polyacetal resin and then extruding the mixture.

The wear parts of the present invention comprise a polyacetal base resin and, incorporated therein, a specific inorganic powder and a specific fatty acid ester. The wear parts thus not only exhibit improved wear and abrasion resistance as compared to parts having only the inorganic powder or the fatty acid ester alone, but its excellent sliding characteristics are maintained even when used for prolonged periods of time. Further, the compositions forming the wear parts of the present invention are not difficult to extrude and mold (which is a problem with conventional compositions) and the components thereof do not separate or "bleed" therefrom. Furthermore, little (if any) noise during use is also one of the significant advantages of the wear parts according to the present invention.

The present invention is thus suitable for use in applications under severe sliding conditions, e.g., as guide rollers, guide poles, and the tape drive systems of VTR's or 8 mm video machines and/or for use in sliding contact with other materials such as bearings and bush rollers.

EXAMPLES

The present invention will now be described in more detail with reference to the following nonlimiting Examples.

EXAMPLES 1 TO 12 AND COMPARATIVE EXAMPLES 1 TO 12

A polyacetal resin (Duracon M90; a product of Polyplastics Co., Ltd.) was mixed with an inorganic powder and a fatty acid ester in proportions shown in Tables 1 and 2. The mixture was melt-kneaded with a twin-screw extruder to pelletize a composition. A specimen was prepared from the pellet by injection molding and was evaluated as described below.

For comparison, evaluation was conducted with respect to (1) a composition having no inorganic powder, (2) a composition containing an inorganic powder having large particle diameters, (3) a composition having no fatty acid ester, (4) a composition containing neither an inorganic powder nor a fatty acid ester, and (5) a composition containing a lubricant other than a fatty acid ester. The results are shown in Tables 1 and 2.

The evaluations were conducted in the following manner:

Extrudability (ease in pelletizing the composition): Extrusion was conducted with a twin-screw extruder equipped with a vent having an inner diameter of 30 mm to observe the state of extrusion. The vent-up, strand foaming, surging phenomenon, and the like were visually observed and collectively evaluated according to the five following qualitative ranks:

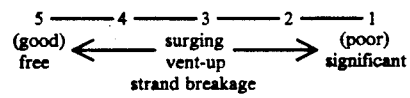

Moldability: Plasticization time was measured with a screw-type injection molding machine under conditions of a cylinder temperature of 190° C. and the number of revolutions of screw of 120 r.p.m. A large value for the plasticization time is indicative of poor moldability because of screw slippage and poor screw grasp.

Figure 1B:
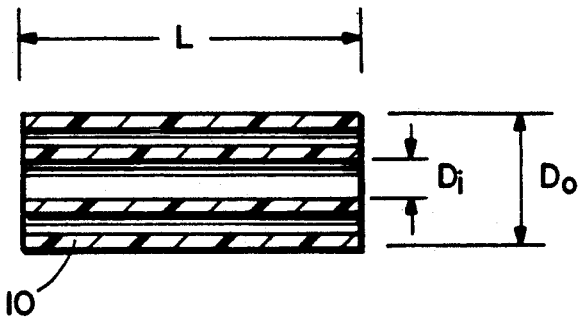
FIG. 1(B) is a cross-sectional view of the roller shown in FIG. 1(A) as taken along lines B—B therein.

Machinability: A guide roller 10 shown in FIGS. 1(A) and 1(B) having a length L of 12 mm, an outside diameter Do of 6 mm, and an inside diameter Di of 2 mm, was prepared and aged at 140° C. for 3 hr. The sliding portion of the inside of the guide roller was cut with a precision lathe, and the internal surface state thereof (burr and fuzzing) was observed under an electron microscope and evaluated according to the five following qualitative ranks:

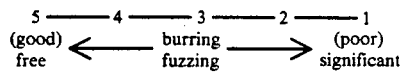

(good) 5 — 4 — 3 — 2 — 1 (poor)
free ← burring/fuzzing → significant

Coefficient of friction and specific abrasion loss: The coefficient of dynamic friction and specific abrasion loss were measured with a Suzuki wear and abrasion tester by making use of a metal (S55C) mating material under conditions of a pressure of 10 kg/cm$^2$, a linear velocity of 30 cm/sec, and a contact area of 2.0 cm$^2$.

Service test: Sliding was conducted with respect ot a metal test shaft 12 as configured in FIG. 2 and a guide roller 10 shown in FIGS. 1(A)-1(B) using a tester shown in FIGS. 3(A) and 3(B) under conditions of a contact load of 100 g, a rotating speed of 5500 r.p.m., and a sliding time of 48 hr to measure a motor load current value as a measure of a torque.

Figure 2:
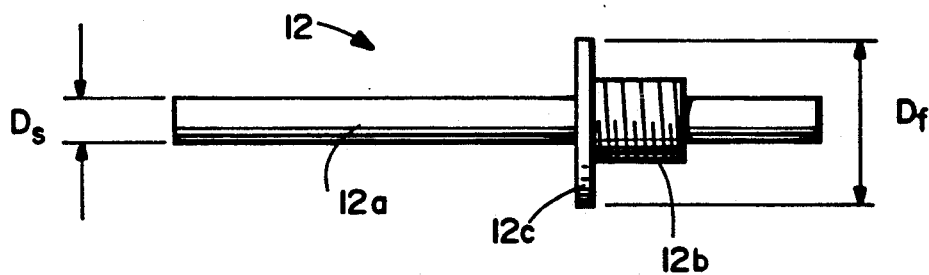
FIG. 2 is a plan view of a shaft similarly used in the evaluations to be discussed below.
Figure 3A:
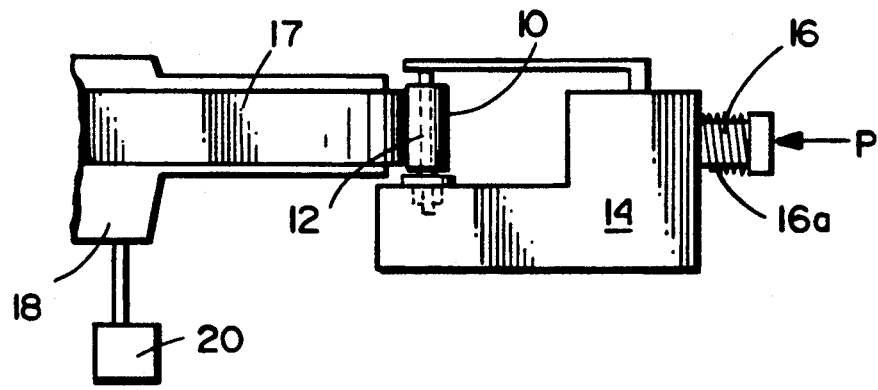
FIGS. 3(A) and 3(B) are respectively a schematic partial cross-sectional view and plan view of a testing device used in measuring changes in current indicative of a torque change caused by a guide roller.
Figure 3B:
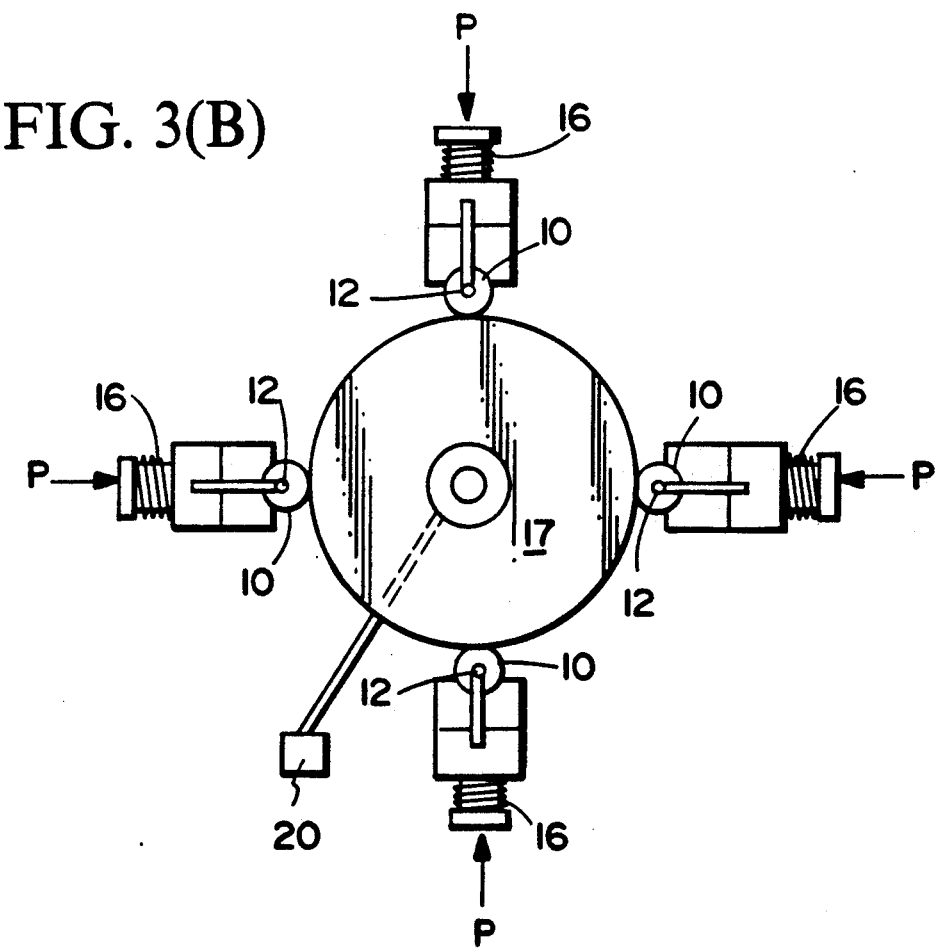

The test shaft 12 included a cylindrical forward shaft portion 12a, and a rearward threaded portion 12b extending rearwardly from a shaft flange 12c (see FIG. 2). The outside diameter of the shaft 12a was equal to the interior diameter (i.e., 2 mm), whereas the diameter of the flange $D_f$ was 7 mm. As shown in FIGS. 3(a) and 3(b), the test shaft was threadably coupled to a support block 14 so that the roller 10 was disposed vertically relative thereto. The block 14 was mounted on a spring shaft 16 and was urged via spring 16a into bearing contact with the circumferential surface of a rotary plate 17. The spring 16a thus exerted a selected contact load between the roller 10 and the rotary plate 17. The rotary plate 17 was formed of metal and had a layer of rubber applied to the circumferential surface thereof. The rotary plate 17 was driven via a drive motor 18, and the current to the motor (indicative of torque changes thereof) was measured using an ammeter 20.

The internal surface of the roller 10 after sliding (seizure, flaw, etc. of the resin) was observed under an electron microscope and evaluated according to the ten following qualitative ranks:

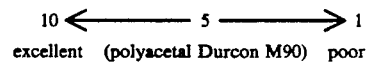

10 ← 5 → 1
excellent (polyacetal Durcon M90) poor

The surface "tackiness" of the guide roller 10 was also observed before and after sliding.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

TABLE 1

| | | | Ex. 1 | Ex. 2 | Ex. 3 | Ex. 4 | Ex. 5 | Ex. 6 | Ex. 7 |
|---|---|---|---|---|---|---|---|---|---|
| Composition | (A) polyacetal resin | wt % | 97.8 | 94.5 | 94 | 92 | 80 | 94.5 | 94.5 |
| | (B) calcium carbonate*[1] (average particle diameter: 3 μm) | wt % | 2 | 5 | 5 | 5 | 15 | 5 | 5 |
| | (C) stearyl stearate | wt % | 0.2 | 0.5 | 1 | 3 | 5 | — | — |
| | behenyl behenate | wt % | — | — | — | — | — | 0.5 | — |
| | pentaerythritol tetrastearate | wt % | — | — | — | — | — | — | 0.5 |
| | silicone oil | wt % | — | — | — | — | — | — | — |
| Quality | extrudability | — | 5 | 5 | 5 | 5 | 4 | 5 | 5 |
| | moldability | sec | 2.3 | 2.2 | 2.7 | 3.8 | 3.9 | 2.4 | 2.3 |
| | machinability | — | 5 | 5 | 5 | 5 | 5 | 5 | 5 |
| | coefficient of dynamic friction | — | 0.20 | 0.17 | 0.16 | 0.16 | 0.20 | 0.18 | 0.18 |
| | specific abrasion loss | mm$^3$/kg · km | 0.6 × 10$^{-2}$ | 0.4 × 10$^{-2}$ | 0.3 × 10$^{-2}$ | 0.3 × 10$^{-2}$ | 0.8 × 10$^{-2}$ | 0.5 × 10$^{-2}$ | 0.5 × 10$^{-2}$ |
| | service test (i) torque (average value) | mÅ | 140 | 128 | 128 | 129 | 135 | 133 | 134 |
| | (variation) | mÅ | 11 | 9 | 8 | 10 | 10 | 12 | 12 |
| | (ii) state of internal surface after sliding | — | 9 | 9 | 9 | 9 | 9 | 9 | 9 |
| | state of surface (tackiness) | — | free | free | free | free | free | free | free |

| | | | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|---|
| Composition | (A) polyacetal resin | wt % | 100 | 95 | 99.5 | 96 | 99.5 | 99.5 | 94.5 |
| | (B) calcium carbonate*[1] (average particle diameter: 3 μm) | wt % | — | 5 | — | — | — | — | 5 |
| | (C) stearyl stearate | wt % | — | — | 0.5 | 4 | — | — | — |
| | behenyl behenate | wt % | — | — | — | — | 0.5 | — | — |
| | pentaerythritol tetrastearate | wt % | — | — | — | — | — | 0.5 | — |
| | silicone oil | wt % | — | — | — | — | — | — | 0.5 |
| Quality | extrudability | — | 5 | 5 | 4 | 1 | 3 | 3 | 3 |
| | moldability | sec | 1.8 | 1.7 | 3.5 | —*[2] | 3.8 | 3.9 | 3.3 |
| | machinability | — | 3 | 5 | 1 | — | 1 | 1 | 3 |
| | coefficient of dynamic friction | — | 0.37 | 0.35 | 0.22 | — | 0.25 | 0.23 | 0.22 |
| | specific abrasion loss | mm$^3$/kg · km | 3.0 × 10$^{-2}$ | 3.2 × 10$^{-2}$ | 1.0 × 10$^{-2}$ | — | 1.1 × 10$^{-2}$ | 1.1 × 10$^{-2}$ | 1.0 × 10$^{-2}$ |
| | service test (i) torque (average value) | mÅ | 161 | 175 | 145 | — | 141 | 139 | 1 |
| | (variation) | mÅ | 15 | 20 | 12 | — | 11 | 10 | 10 |

TABLE 1-continued

| | | | | | | | | | |
|---|---|---|---|---|---|---|---|---|---|
| (ii) state of internal surface after sliding | — | 5 | 6 | 7 | — | 7 | 7 | 6 |
| state of surface (tackiness) | — | free | free | slightly tacky | — | slightly tacky | slightly tacky | tacky |

*[1] particles having a diameter of 50 μm or less: 99% <
*[2] Molding could not be conducted because the compositon could not be grasped by the molding machine.

TABLE 2

| | | | Ex. | | | | | Comp. Ex. | | | | |
|---|---|---|---|---|---|---|---|---|---|---|---|---|
| | | | 8 | 9 | 10 | 11 | 12 | 8 | 9 | 10 | 11 | 12 |
| Composition | (A) polyacetal resin | wt % | 94.5 | 94.5 | 94.5 | 94.5 | 94.5 | 95 | 95 | 95 | 95 | 94.5 |
| | (B) calcium carbonate (average particle diameter: 20 μm)*[1] | wt % | 5 | — | — | — | — | 5 | — | — | — | — |
| | calcium carbonate (average particle diameter: 70 μm)*[2] | wt % | — | — | — | — | — | — | — | — | — | 5 |
| | talc (average particle diameter: 3 μm)*[3] | wt % | — | 5 | — | — | — | — | 5 | — | — | — |
| | silica (average particle diameter: 2 μm)*[4] | wt % | — | — | 5 | 5 | — | — | — | 5 | — | — |
| | clay (average particle diameter: 2 μm)*[5] | wt % | — | — | — | — | 5 | — | — | — | 5 | — |
| | (C) stearyl stearate | wt % | 0.5 | 0.5 | 0.5 | — | 0.5 | — | — | — | — | 0.5 |
| | behenyl behenate | wt % | — | — | — | 0.5 | — | — | — | — | — | — |
| Quality | extrudability | — | 5 | 5 | 5 | 5 | 5 | 5 | 5 | 5 | 5 | 5 |
| | moldability | sec | 2.5 | 2.2 | 2.3 | 2.4 | 2.4 | 1.8 | 1.9 | 1.7 | 1.8 | 2.5 |
| | machinability | — | 5 | 5 | 5 | 5 | 5 | 5 | 5 | 5 | 5 | 5 |
| | coefficient of dynamic friction | — | 0.19 | 0.18 | 0.17 | 0.17 | 0.18 | 0.35 | 0.36 | 0.34 | 0.35 | 0.30 |
| | specific abrasion loss | mm$^3$/kg · km | $0.9 \times 10^{-2}$ | $0.5 \times 10^{-2}$ | $0.4 \times 10^{-2}$ | $0.4 \times 10^{-2}$ | $0.6 \times 10^{-2}$ | $3.8 \times 10^{-2}$ | $3.5 \times 10^{-2}$ | $3.3 \times 10^{-2}$ | $3.2 \times 10^{-2}$ | $2.8 \times 10^{-2}$ |
| | service test (i) torque (average value) | mA | 141 | 138 | 135 | 134 | 137 | 180 | 178 | 168 | 174 | 170 |
| | (variation) | mA | 14 | 13 | 13 | 9 | 10 | 20 | 20 | 18 | 17 | 30 |
| | (ii) state of internal surface after sliding | — | 9 | 9 | 9 | 9 | 9 | 6 | 6 | 6 | 6 | 7 |
| | state of surface (tackiness) | — | free | free | free | free | free | free | free | free | free | free |

*[1] particles having a diameter of 100 μm or less: 98% < particles having a diameter of 50 μm or less: 95%
*[2] particles having a diameter of 100 μm or less: 92% <
*[3] particles having a diameter of 100 μm or less: 99% < particles having a diameter of 50 μm or less: 96%
*[4] particles having a diameter of 100 μm or less: 99% < particles having a diameter of 50 μm or less: 97%
*[5] particles having a diameter of 100 μm or less: 99% < particles having a diameter of 50 μm or less: 98%

We claim:

1. A self-lubricating polyacetal wear part having improved anti-friction and sliding characteristics formed of a polyacetal resin composition which consists essentially of:
   (A) a polyacetal base resin;
   (B) between 1 to 20% by weight, based on the total composition weight, of a calcium carbonate powder having an average particle diameter of 10 μm or less, and a particle diameter distribution such that at least 95% of the particles have a diameter of 100 μm or less; and
   (C) a self-lubricating effective amount of between 0.1 to 5% by weight, based on the total composition weight, of stearyl stearate.

2. A self-lubricating polyacetal wear part as in claim 1, in the form of a guide roller or guide pole for magnetic recording tape.

UNITED STATES PATENT AND TRADEMARK OFFICE
CERTIFICATE OF CORRECTION

PATENT NO.   : 5,106,896

DATED        : April 21, 1992

INVENTOR(S)  : Endo et al

It is certified that error appears in the above-identified patent and that said Letters Patent is hereby corrected as shown below:

TITLE PAGE:

Under "Abstract", line 8, change "roller" to --rollers--;
                 line 9, change "pole" to --poles--.

Column 3, line 7, delete " evaluation of a guide roller used in the";
          line 45, change "norganic" to --inorganic--.

Column 4, line 25, after "myristate" insert a comma (,);
          line 26, after "stearate" insert a comma (,);
          line 36, after "ester" delete "can";
          line 65, after "drives" insert --and--.

Column 7, line 12, after "respect" change "ot" to --to--.

Signed and Sealed this

Fourteenth Day of December, 1993

Attest:

BRUCE LEHMAN

*Attesting Officer*    *Commissioner of Patents and Trademarks*